Patented Feb. 14, 1939

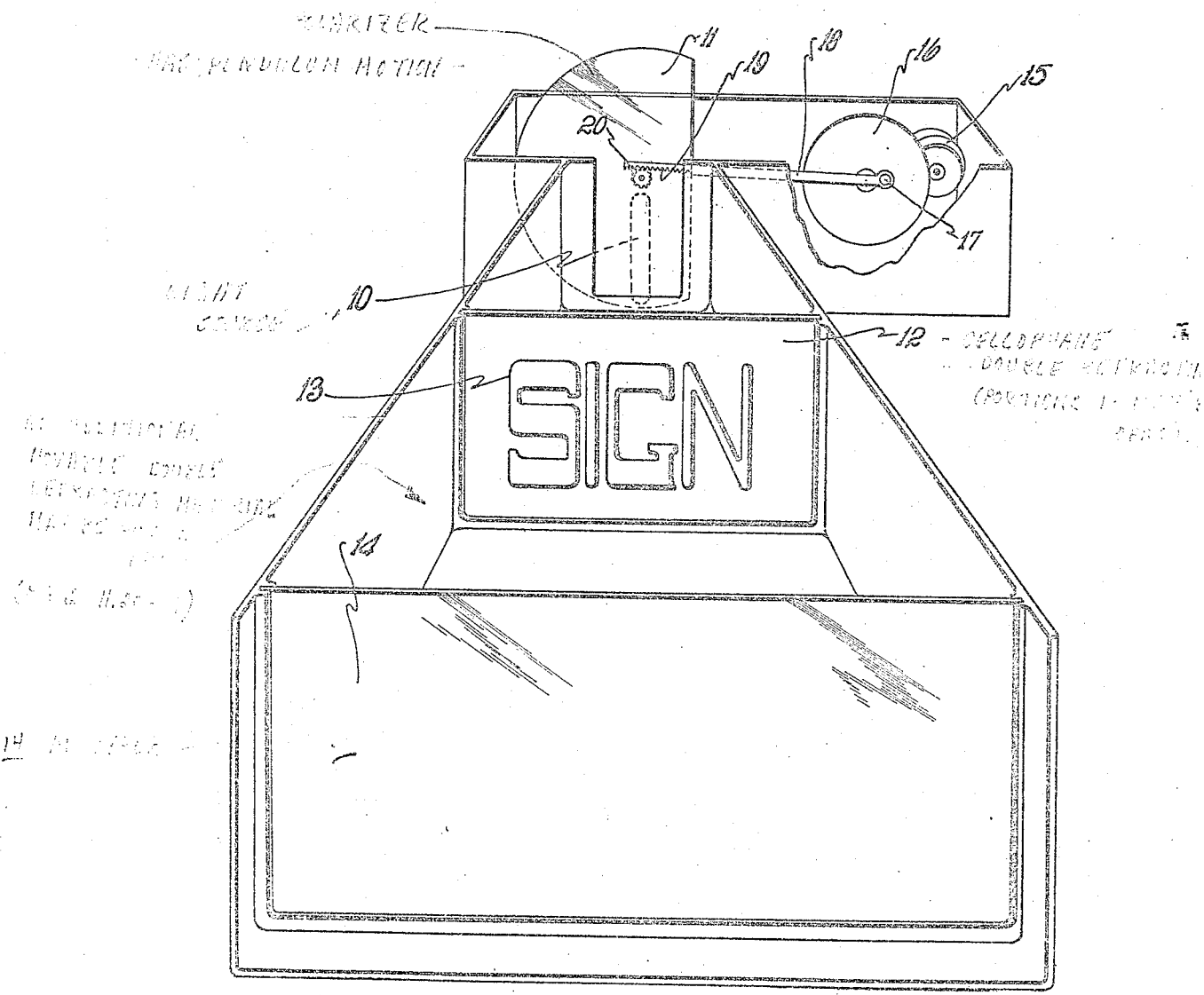

2,146,962

UNITED STATES PATENT OFFICE 2,146,962

DISPLAY DEVICE

Edwin H. Land, Wellesley Farms, Mass., assignor, by mesne assignments, to Polaroid Corporation, Dover, Del., a corporation of Delaware Application October 21, 1935, Serial No. 45,918

4 Claims. (Cl. 88—65)

This invention relates to a display device and, more specifically, to display devices employing polarized light and adapted to present changing and variegated color effects.

This application is a continuation, in part, of my copending application, Serial No. 700,971, which issued October 22, 1935, as Patent No. 2,018,214.

In general, it is an object of the invention to provide a device of the character described, which will efficiently perform the purposes for which it is intended, which is simple and economical of construction, which can be expeditiously and conveniently manipulated, and which can be readily manufactured and assembled.

Other objects of the invention are to provide a device whereby a design is illuminated by a succession or cycle of colors; to provide such a device whereby the progress of the cycle is not constant; to provide such a device whereby the period of the cycle, during which the more interesting color or colors are to be observed, is prolonged relative to some other portion of the cycle; to provide such a device wherein one portion of the design undergoes one cycle of color changes while another portion undergoes a different cycle; and to provide such a device wherein the colors in the cycle or cycles arise from the use of polarized light.

Other objects of the invention will, in part, be obvious, and will, in part, appear hereinafter.

The invention accordingly comprises the features of construction, combination of elements, and arrangement of parts, which will be exemplified in the construction hereinafter set forth, and the scope of the application of which will be indicated in the claims.

For a fuller understanding of the nature and objects of the invention, reference should be had to the following detailed description taken in connection with the accompanying drawing, which is a perspective view of a device embodying one form of the invention, the top not being shown.

The light from any suitable source 10, as shown in the drawing, is polarized by any suitable means, such as the sheet or screen 11, which may be formed of the material described in U. S. Patent No. 1,918,848. This material may comprise a set suspending medium with a plurality of polarizing bodies immovably embedded therein, having their polarizing axes oriented to be in substantial parallelism. Before being polarized, the light may pass through a diffusing screen, e. g., it may be a frosted electric light bulb.

An element 12, which is to be seen by an observer, is positioned so as to receive the polarized light, and to impress a design thereon. It may consist of one or more areas 13, which may form any desired design, such as letters or a picture. Either the entire element 12, or the areas 13, or both, are formed of doubly refracting material, for example "Cellophane". Portions of the element 12, may, if desired, be opaque, whereby a stencilled effect may be secured.

The light which has had a design impressed upon it is further intercepted by a second polarizing element 14, which acts as an analyzer and which may be of any suitable form, such as a sheet of material similar in structure to the element 11. It may be adjacent or spaced from the element 12. It will be understood that all of the elements described may, if desired, be positioned closely adjacent one another.

Any one or more of the elements 11, 12 or 14, for example, sheet 11, may be movable and may have a predetermined motion, preferably cyclical and preferably pendulum-like. In the latter motion, the element revolves or oscillates back and forth through a predetermined arc about a point in the plane of the element, and with less velocity near the ends of the path than at the middle.

Any suitable means may be provided to give the pendulum-like motion to the element 11. As shown, motor means 15 drives a reduction wheel 16, to which is attached a crank pin 17. A connecting rod 18, pivoted on pin 17, has teeth in the form of a rack, which engages with a pinion 20, the latter being fixed to a shaft on which the element 11 is also fixed. The motion of the rack gives an alternately accelerated and decelerated angular motion to the element 11. In place of the motor, rack, etc., there may be used any conventional electro-magnetic activating device which may operate by giving successive timed pulses to the swinging element.

Various parts of the device may be variously arranged. The light from the source 10 may be thrown in a parallel beam onto the screen 11, or it may be allowed to strike that screen at a plurality of angles. The plane of polarization of the screen 11 may have any orientation, and the plane of polarization of the analyzer 14 may be at any desired angle with the plane of polarization of the polarizer 11. Also, the optical axes of the doubly refracting material in the element 12 may have any desired position, preferably, however, at an angle of 45° to the polarizing axis of the element 14.

Depending upon the relative positions of the principal planes of the polarizing and doubly refracting material, the element 12 will appear to be illuminated with light of various colors, and for certain relative positions the apparent intensity of the illuminating color is greater than in others, the coloring being most marked when the planes of polarization of the polarizing elements 11 and 14 are at right angles or parallel to each other, and bisect the angles between the principal planes, i. e., optical directions, of the doubly refracting element 13. If element 11 is chosen to be moved, it may be given a motion such that it moves slowly, and for a long time, at the end of the swing, while the coloring is marked and moves rapidly at the "bottom" of its pendulum-like swing, while the coloring is less marked. There is thus obtained a swift change from one marked color condition to another.

Although the drawing shows a movable polarizer, it may be desirable, under certain circumstances, to have the polarizer, the analyzer and the doubly refracting element remain fixed with respect to each other, and to have a movable, doubly refracting element added between the fixed doubly refracting element and either the polarizer or the analyzer.

If desired, various ones of the areas 13 may be of various depths, presenting, thereby, paths of various lengths to the light passing therethrough, and introducing various phase retardations, thus giving the different areas different colors.

A special light source may be used which gives off a plurality of wavelengths differing from each other by a considerable wavelength difference, and which may be termed linear or discontinuous, e. g., neon. The effect on the observer is to be noted in the sharper color changes.

It will be readily seen that the present device is exceedingly useful, particularly in the field of signs and advertising. The spectral colors are, in all cases, most pleasing to the human eye, and most attention-compelling. If the design is in the form of a dancing girl, for example, an observer may see parts of her dress in various clear, bright, spectral colors, which colors change from moment to moment.

Since certain changes may be made in the above construction, and different embodiments of the invention could be made without departing from the scope thereof, it is intended that all matter contained in the above description, or shown in the accompanying drawing, shall be interpreted as illustrative, and not in a limiting sense.

It is also understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A display device comprising, in combination, a light source, a plurality of relatively thin light-polarizing elements positioned in the path of a beam, emanating from said source, doubly refracting material interposed between said polarizing elements and positioned with respect thereto to impart a color characteristic to said beam, and means adapted to impart a pendulum-like motion to at least one of said elements whereby the color characteristics of the transmitted beam are caused to change periodically, said elements being so positioned with respect to each other that at the instant of change in the direction of motion of said moving element said light-polarizing elements are positioned with their polarizing axes substantially at an angle X, such that sin 2X equals 0, and a principal optical direction of said doubly refracting material is at a predetermined angle to said polarizing axes.

2. A display device comprising, in combination, a light source, means associated therewith and adapted to project a diverging beam, a plurality of relatively thin light-polarizing elements positioned in the path of said beam adapted to transmit substantially all of the said diverging beam impinging thereon, doubly refracting material interposed between said polarizing elements and positioned with respect thereto to impart a color characteristic to said beam, and means adapted to impart a pendulum-like motion to at least one of said elements whereby the color characteristics of the transmitted beam are caused to change periodically, said elements being so positioned with respect to each other that at the instant of change in the direction of motion of said moving element said light-polarizing elements are positioned with their polarizing axes substantially at an angle X, such that sin 2X equals 0, and a principal optical direction of said doubly refracting material is at a predetermined angle to said polarizing axes.

3. In combination with a light source, a plurality of relatively thin, light-polarizing elements, doubly refracting material positioned between said elements, said elements and said material cooperating to impart a predetermined color characteristic to a beam of light emanating from said source, at least one of said elements other than the polarizing element positioned furthest from said light source being so mounted as to permit rotation thereof with respect to said other elements, means to impart to said rotatable element an alternate clockwise and counter-clockwise rotation whereby the color characteristic of the beam transmitted by said elements may be caused to vary, and means to so position said light-polarizing elements that at the instant of change in the direction of rotation of said rotatable element the polarizing axes of said light-polarizing elements form with each other an angle X, such that sin 2X equals 0.

4. In combination with a light source adapted to project a diverging beam, a plurality of relatively thin light-polarizing elements interposed in the path of said beam, doubly refractive means positioned between said elements and adapted for variously retarding the phase of various wave lengths of the light in said beam, and means adapted for cyclically changing the orientation of said last-mentioned retarding means with respect to at least one of said polarizing elements whereby the color characteristics of the transmitted beam are altered, the orientation of said retarding means with respect to said polarizing elements being such that the greatest color intensity of the transmitted beam occurs substantially at each end of the cycle of change in said orientation.

EDWIN H. LAND.